United States Patent
Yonetani

(10) Patent No.: US 11,614,564 B2
(45) Date of Patent: Mar. 28, 2023

(54) OPTICAL ELEMENT, OPTICAL APPARATUS, IMAGE PICKUP APPARATUS, AND METHOD FOR PRODUCING OPTICAL ELEMENT

(71) Applicant: CANON KABUSHIKI KAISHA, Tokyo (JP)

(72) Inventor: Kouichi Yonetani, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 286 days.

(21) Appl. No.: 16/890,303

(22) Filed: Jun. 2, 2020

(65) Prior Publication Data
US 2020/0386914 A1  Dec. 10, 2020

(30) Foreign Application Priority Data

Jun. 6, 2019 (JP) .............................. JP2019-106575

(51) Int. Cl.
| | | |
|---|---|---|
| G02B 1/04 | (2006.01) | |
| G02B 7/02 | (2021.01) | |
| B29C 43/02 | (2006.01) | |
| B29C 43/14 | (2006.01) | |
| B29D 11/00 | (2006.01) | |

(Continued)

(52) U.S. Cl.
CPC ............ *G02B 1/041* (2013.01); *B29C 43/021* (2013.01); *B29C 43/146* (2013.01); *B29D 11/00009* (2013.01); *B29D 11/0048* (2013.01); *G02B 7/02* (2013.01); *B29K 2033/12* (2013.01); *B29K 2709/08* (2013.01); *B29L 2011/0016* (2013.01)

(58) Field of Classification Search
CPC .......... G02B 1/041; G02B 7/02; G02B 7/025; B29C 43/021; B29C 43/146; B29C 43/18; B29C 2043/185; B29C 2043/189; B29D 11/00009; B29D 11/0048; B29D 11/00442; B29D 11/0073; B29K 2033/12; B29K 2709/08; B29L 2011/0016
See application file for complete search history.

(56) References Cited

U.S. PATENT DOCUMENTS 10,908,436 B2 *  2/2021  Miyamoto ............. G02B 5/285
2013/0170034 A1 *  7/2013  Merrill ..................... G02B 5/32
264/1.36

(Continued)

FOREIGN PATENT DOCUMENTS

JP          2016-194609 A       11/2016

*Primary Examiner* — Nahida Sultana
(74) *Attorney, Agent, or Firm* — Canon U.S.A., Inc., IP Division

(57) ABSTRACT

An optical element includes a first substrate having a first surface, a resin member disposed on the first surface, and a second substrate disposed above the resin member with a joining member interposed therebetween. The resin member has a first region contacting the joining member and a second region surrounding the first region and not contacting the joining member. An inclined portion having a thickness increasing from a starting point located in the second region toward an outer circumference of the resin member, is disposed in the second region. A tangent of the first surface, orthogonal to a normal of the first surface passing through the starting point, and a straight line passing through the starting point and a point at which the inclined portion has a largest thickness, form an angle of 25° or more and 45° or less.

10 Claims, 6 Drawing Sheets

(51) Int. Cl.
  *B29K 33/00* (2006.01)
  *B29L 11/00* (2006.01)
  *B29K 709/08* (2006.01)

(56) References Cited

U.S. PATENT DOCUMENTS

2015/0362705 A1\* 12/2015 Nabighian ............. G02B 7/022
                                                      425/470
2021/0096318 A1\* 4/2021 Dobashi ............... G02B 13/001

\* cited by examiner

FIG. 1A
FIG. 1B
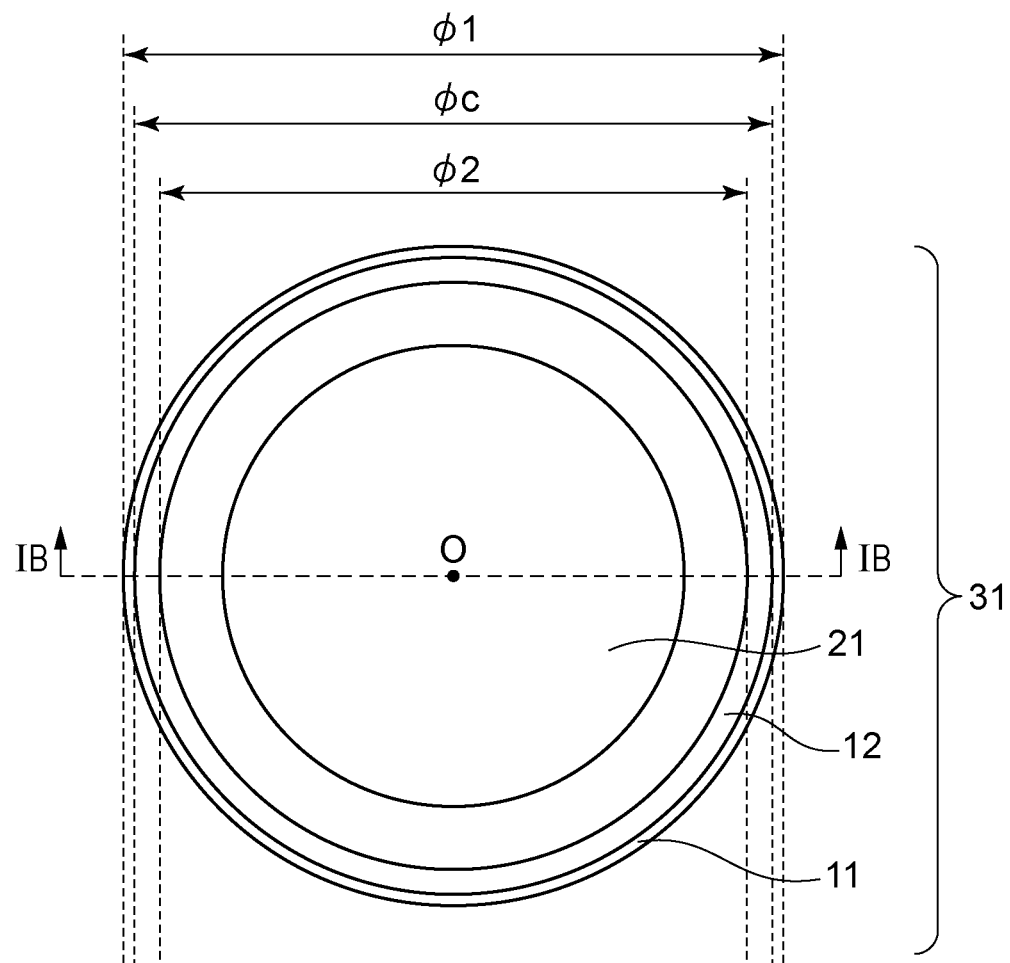
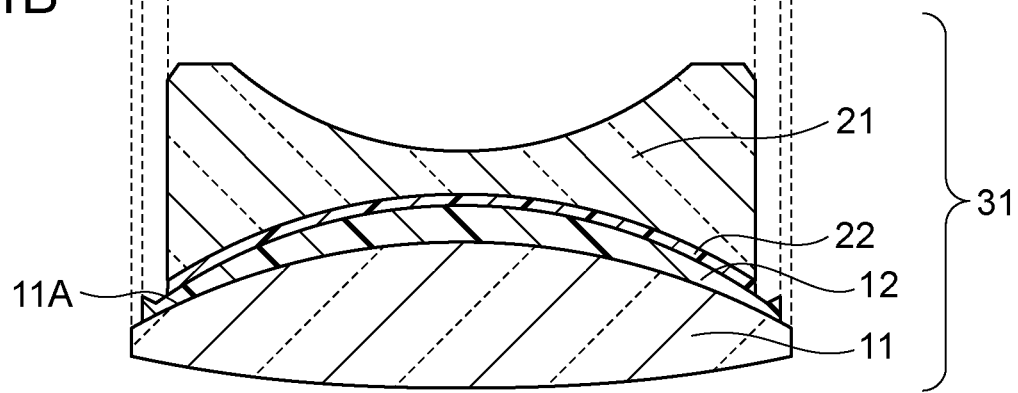

OPTICAL ELEMENT, OPTICAL APPARATUS, IMAGE PICKUP APPARATUS, AND METHOD FOR PRODUCING OPTICAL ELEMENT

BACKGROUND

Field of the Disclosure

The present disclosure relates to an optical element including a resin member and a joining member disposed between two substrates.

Description of the Related Art

In recent years, with an increasing demand for high performance of image pickup apparatuses such as cameras and video cameras, optical elements such as lenses for optical apparatuses including an image pickup optical system have been required to have high optical performance and environmentally friendly performance. For example, a known optical element includes a resin member joined between two substrates (glass or hard plastic). When the optical system of an optical apparatus is constituted by a plurality of lenses, another lens for correcting chromatic aberration caused by spherical lenses is known to be disposed in the optical system.

Japanese Patent Laid-Open No. 2016-194609 discloses, as a lens for correcting chromatic aberration, an optical element including a resin member and a joining member disposed between two substrates.

SUMMARY

An optical element includes a first substrate having a first surface, a resin member disposed on the first surface of the first substrate, and a second substrate disposed above the resin member with a joining member interposed therebetween, wherein the resin member has a first region that is in contact with the joining member and a second region that surrounds the first region and is not in contact with the joining member, wherein an inclined portion having a thickness, as measured in a direction normal to the first surface, that increases from a starting point in the second region to a thickest point toward an outer circumference of the resin member, is disposed in the second region of the resin member, and wherein a tangent of the first surface, orthogonal to a normal of the first surface which passes through the starting point of the inclined portion, and a straight line, that extends through the starting point and the thickest point, form an angle of 25° or more and 45° or less.

Further features of the present disclosure will become apparent from the following description of exemplary embodiments with reference to the attached drawings.

BRIEF DESCRIPTION OF THE DRAWINGS

FIGS. 1A and 1B schematically illustrate an optical element according to an embodiment of the present disclosure.

DESCRIPTION OF THE EMBODIMENTS

Figure 2:
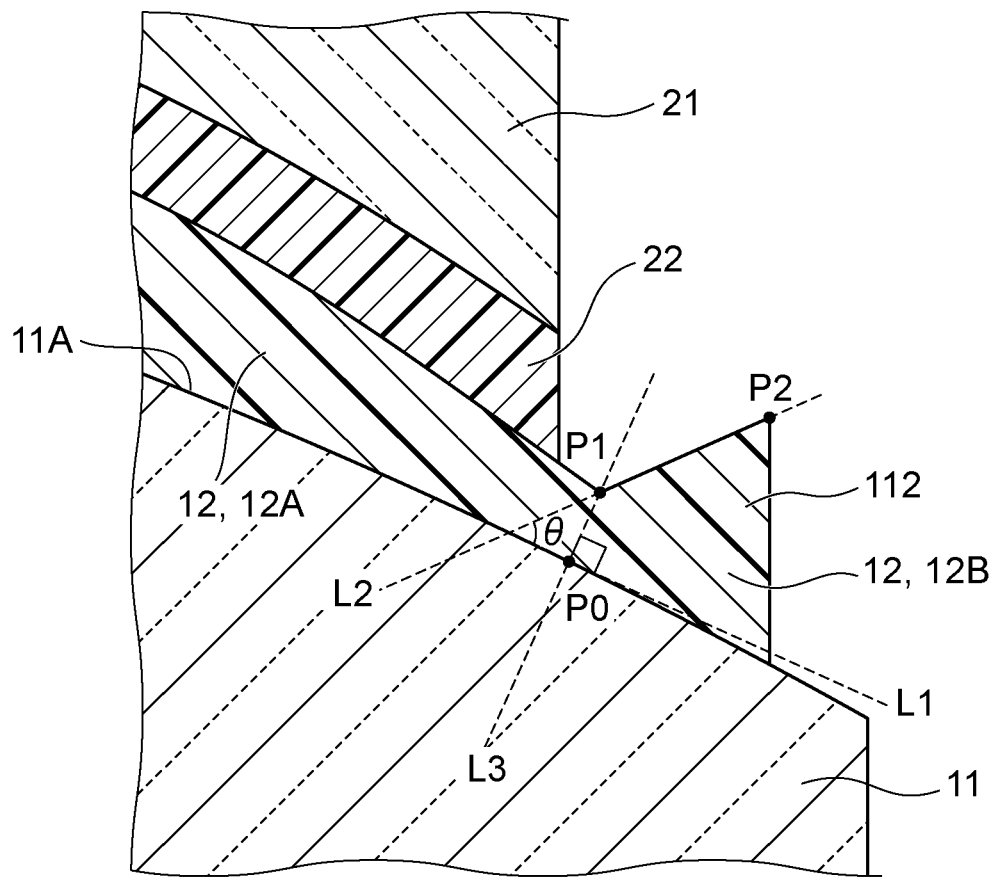
FIG. 2 is a partially enlarged view of the optical element in FIG. 1.

The optical element having a shape disclosed in Japanese Patent Laid-Open No. 2016-194609 includes substrates and a resin member having different linear expansion coefficients. Therefore, when the ambient temperature changes, the substrates and the resin member have different degrees of deformation. Furthermore, the resin member has one surface in contact with the substrate and the other surface not in contact with the substrate at its outer circumference. Therefore, the resin member considerably deforms at the surface not in contact with the substrate, but the movement of the resin member is restricted by the substrate at the surface in contact with the substrate, which suppresses deformation. As a result, stress generated at the interface between the substrate and the resin member remains in the resin member, and thus separation readily occurs between the substrate and the resin member in known optical elements. This embodiment provides an optical element in which separation does not readily occur between the substrate and the resin member by reducing the influence due to stress generated at the interface between the substrate and the resin member.

Optical Element

FIGS. 1A and 1B schematically illustrate an optical element according to an embodiment of the present disclosure. FIG. 1A is a top view in a laminate direction, and the straight line IB-IB is a straight line that passes through the center O of an optical element 31. FIG. 1B is a partial sectional view obtained by diametrically (straight line IB-IB) cutting the optical element 31 in the laminate direction.

The optical element 31 includes a resin member 12 and a joining member 22 disposed between a first substrate 11 and a second substrate 21. Hereafter, description will be made using an example in which the first substrate 11 whose surface facing the resin member 12 is a convex surface, the resin member 12, the joining member 22, and the second substrate 21 whose surface facing the joining member 22 is a concave surface are laminated in sequence. The direction in which light enters the optical element 31 is not particularly limited. In other words, light may enter the first substrate 11 or the second substrate 21.

The first substrate 11 has an outer diameter (maximum outer diameter) 41 and a first surface 11A. The resin member 12 is disposed on the first surface 11A. The first surface 11A can be subjected to primer treatment with a silane coupling agent or the like to improve the adhesion with the resin member 12. The first substrate 11 is formed of various glasses such as typical optical glass, e.g., a silicate glass, a borosilicate glass, or a phosphate glass, quartz glass, and glass-ceramic. A transparent (hard) plastic can also be used instead of glass. The curvature of the convex surface can be appropriately set in accordance with the desired optical performance of the optical element.

The resin member 12 is disposed on the first substrate 11. The resin member 12 has an outer diameter (maximum outer diameter) φc smaller than or equal to the outer diameter φ1 of the first substrate 11. That is, φc≤φ1 is satisfied. Furthermore, the outer diameter φc of the resin member 12 is larger than the outer diameter φ2 of the second substrate 21. That is, φ2<φc is satisfied. The resin member 12 has a first region 12A that is in contact with the joining member 22 and a second region 12B that surrounds the first region 12A and is not in contact with the joining member 22.

The first region 12A of the resin member 12 has a so-called "uneven thickness shape" whose thickness is largest around the center and continuously decreases toward the outer circumference. When the resin member 12 has an uneven thickness shape in an optically effective region of the optical element, the effect of correcting chromatic aberration can be improved. Herein, the thickness of the resin member 12 is a thickness of the resin member 12 in a surface normal direction of the first surface 11A of the first substrate. The thickness of the resin member 12 can be set to 10 μm or more and 3 mm or less from the viewpoints of the chromatic aberration correction function and a decrease in the probability of formation of cracks. If the thickness is less than 10 μm, the chromatic aberration correction function may be not sufficient. If the thickness is more than 3 mm, the stress distribution is generated in a thickness direction, which may cause formation of cracks.

The second region 12B of the resin member 12 has an inclined portion 112. FIG. 2 is a partially enlarged view of the optical element in FIG. 1B. Hereafter, the inclined portion 112 will be described with reference to FIG. 2.

The inclined portion 112 has a thickness that increases in a radial direction from the starting point P1 located in the second region toward the outer circumference of the resin member 12. The point P2 is a point at which the inclined portion 112 has the largest thickness. In FIG. 2, the thickness of the inclined portion linearly increases from the starting point P1 to the point P2 in a continuous manner, but does not necessarily linearly increase. The inclined portion 112 is not necessarily disposed in the entire second region 12B. As illustrated in FIG. 2, the resin member 12 may have, between the starting point P1 located in the second region and the first region 12A, a portion whose thickness decreases in the radial direction toward the outer circumference. The resin member 12 may have a portion whose thickness increases in the radial direction toward the outer circumference at an inclination angle of less than 25° described later. The inclined portion 112 can be disposed at the outer circumference (outer periphery) of the resin member 12.

Next, the inclination angle of the inclined portion 112 will be described. First, the surface normal of the first surface 11A of the first substrate that passes through the starting point P1 is defined as L3, and the tangent of the first surface 11A at a point P0 that is orthogonal to the surface normal L3 is defined as L1. The point P0 is a point through which the surface normal L3 passes. The straight line that passes through the starting point P1 and the point P2 at which the inclined portion 112 has the largest thickness is defined as L2. Herein, the angle between the tangent L1 and the straight line L2 is 25 or more and 45° or less. In this specification, the angle between the tangent L1 and the straight line L2 is defined as an inclination angle of the inclined portion.

If the angle between the tangent L1 and the straight line L2 (inclination angle) is less than 25°, the stress generated at an interface of the resin member 12 with the first surface 11A of the first substrate in the surface normal direction of the first surface 11A considerably affects adhesion of the resin member 12. Therefore, when the optical element is left to stand in a high-temperature (e.g., 70° C.) environment and then cooled to room temperature (e.g., 23° C.±2° C.), separation (floating) readily occurs at the interface of the resin member 12 with the first surface 11A of the first substrate. The separation also readily occurs from the outer circumference. On the other hand, if the angle between the tangent L1 and the straight line L2 is more than 45°, the stress generated at an interface of the resin member 12 with the first surface 11A of the first substrate in the tangent direction of the first surface 11A considerably affects the resin member 12. Therefore, in the case where the optical element is left to stand in a high-temperature environment and then cooled to room temperature, if separation occurs at the outer circumference, the separation moves from the outer circumference of the resin member 12 toward the center.

Furthermore, if the angle between the tangent L1 and the straight line L2 is more than 45°, release failure is highly likely to occur when the resin member 12 is molded by replica molding. This is because if the angle between the tangent L1 and the straight line L2 is more than 45°, the thickness at the outer circumference of the resin member 12 is relatively larger than that of other portions, which increases a force required for release from a mold. For this reason, the inclination angle of the inclined portion 112 is set to 25 or more and 45° or less and preferably 30° or more and 45° or less.

The maximum thickness of the inclined portion 112 can be set to 20 μm or more and 660 μm or less. The maximum thickness of the inclined portion refers to a distance of a line segment joining the first substrate 11 and the point P2 on a surface normal passing through the point P2 among surface normals of the first substrate 11. If the thickness is less than 20 μm, the stress generated at an interface of the resin member 12 with the first surface 11A of the first substrate in the surface normal direction of the first surface 11A considerably affects the resin member 12. Therefore, even if the above-described inclination angle is satisfied, separation may readily occur at the interface between the resin member 12 and the first surface 11A of the first substrate when the optical element is left to stand in a high-temperature environment and then cooled to room temperature. On the other hand, if the thickness is more than 660 μm, release failure is highly likely to occur when the resin member 12 is molded by replica molding. This is because the thickness at the outer circumference of the resin member 12 is relatively larger than that of other portions, which increases a force required for release from a mold. The maximum thickness of the inclined portion is preferably 2 times or more and 13 times or less the minimum thickness of the resin member 12.

The distance from the point P1 of the inclined portion 112 to the end of the resin member 12 (the distance in a direction orthogonal to the optical axis direction) can be set to 0.2 mm to 0.55 mm. If the distance is less than 0.2 mm, the maximum thickness is not sufficient even when the above-described inclination angle is satisfied, which may easily cause separation at the interface of the resin member 12 with the first surface 11A of the first substrate. If the distance is more than 0.55 mm, the size of a region other than the optically effective region increases. Consequently, when the optical element is used as a lens in an optical system, the flexibility in design of the optical system may decrease. In FIG. 2, the inclined portion 112 is formed so that the end portion of the inclined portion 112 vertically extends from the point P2 in a downward direction of the drawing and comes in contact with the first substrate 11 (extends in a direction parallel to the optical axis), but the end portion does not necessarily have such a shape. The end portion may be concave in the central direction or may be convex in the radial direction. The end portion may have a shape with a fat tail extending toward the outer periphery relative to the point P2.

The material for the resin member 12 can be appropriately selected in accordance with the desired optical properties. Examples of the material include cured products of thermosetting resins and photo-curable resins. The thermosetting resins and the photo-curable resins may contain fine particles dispersed therein in order to adjust the optical properties. The material for the resin member 12 may be a photo-curable resin from the viewpoint of employing a simple production process. The photo-curable resin may be an acrylic resin from the viewpoint of achieving good optical properties. The acrylic resin may be a polymer or copolymer of a compound having an acryloyl group or a methacryloyl group and represented by formula (1) below.

Formula (1)

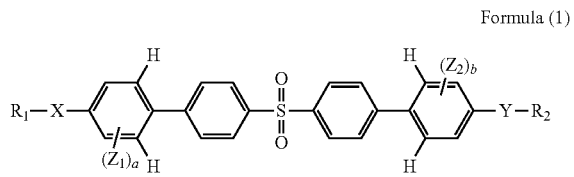

In the formula (1), X and Y each represent a substituent selected from substituents below:

*—S—

*—O—

*—O—CH$_2$CH$_2$—

*—O—CH$_2$CH$_2$—S—

*—S—CH$_2$CH$_2$—

*—S—CH$_2$CH$_2$—S—

*—O—CH$_2$CH$_2$CH$_2$—

*—O—CH$_2$CH$_2$CH—S—

*—S—CH$_2$CH$_2$CH$_2$—

*—S—CH$_2$CH$_2$CH$_2$—S—

*—S—CH$_2$CH$_2$CH$_2$CH$_2$—S—

*—O—CH$_2$CH$_2$CH$_2$CH$_2$—O—

*—O—CH$_2$CH$_2$CH$_2$CH$_2$—S—

*—S—CH$_2$CH$_2$CH$_2$CH$_2$—O— where * represents a bonding arm with $R_1$ or $R_2$.

In the formula (1), $R_1$ and $R_2$ each represent a substituent selected from a hydrogen atom, an alkyl group having 1 or 2 carbon atoms, and a (meth)acryloyl group (referred to as an acryloyl group or a methacryloyl group, the same applies hereafter). $Z_1$ and $Z_2$ each represent a substituent selected from a hydrogen atom, a halogen atom, an alkoxy group having 1 or 2 carbon atoms, an alkylthio group having 1 or 2 carbon atoms, an unsubstituted alkyl group having 1 or 2 carbon atoms, and a substituent represented by formula (2) below.

Formula (2)

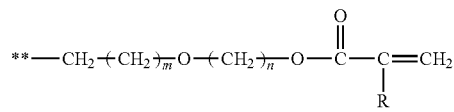

In the formula (2), ** represents a bonding arm, m represents 0 or 1, n represents an integer of 2 to 4, and R represents hydrogen or a methyl group.

In the formula (1), a and b each represent an integer of 0 to 2. When a represents 2, two $Z_1$ may be the same or different. When b represents 2, two $Z_2$ may be the same or different.

The joining member 22 is disposed on the first region 12A of the resin member, serves as a layer that joins the resin member 12 and the second substrate 21, and is formed by curing an adhesive. The joining member 22 is formed of a resin, which is selected so as to achieve high adhesion strength between the resin member 12 and the second substrate 21. The resin is not particularly limited, and may be a thermosetting resin or a photo-curable resin. The resin may be a photo-curable resin with which a simple production method can be employed and which causes less deformation during production. The resin may be an acrylic photo-curable resin from the viewpoint of causing no deformation of the resin member in the production process. The thickness of the joining member 22 may be 1 µm or more and 30 µm or less. Herein, the thickness of the joining member 22 refers to a thickness of the joining member 22 in a surface normal direction of a surface of the second substrate 21 in contact with the joining member 22. If the joining member 22 has a thickness of less than 1 µm, the adhesion between the resin member 12 and the second substrate 21 may be insufficient. If the joining member 22 has a thickness of more than 30 µm, a change in volume relative to a change in ambient temperature increases, which may deteriorate the chromatic aberration correction function.

The second substrate 21 has an outer diameter (maximum outer diameter) ϕ2 that is smaller than the outer diameter ϕc of the resin member. The surface of the second substrate 21 in contact with the joining member 22 can be subjected to primer treatment with a silane coupling agent or the like. The second substrate 21 is formed of various glasses such as typical optical glass, e.g., a silicate glass, a borosilicate glass, or a phosphate glass, quartz glass, and glass-ceramic. A transparent (hard) plastic can also be used instead of glass. The curvature of the concave surface can be appropriately set in accordance with the desired optical performance of the optical element.

Method for Producing Optical Element

Figure 3:
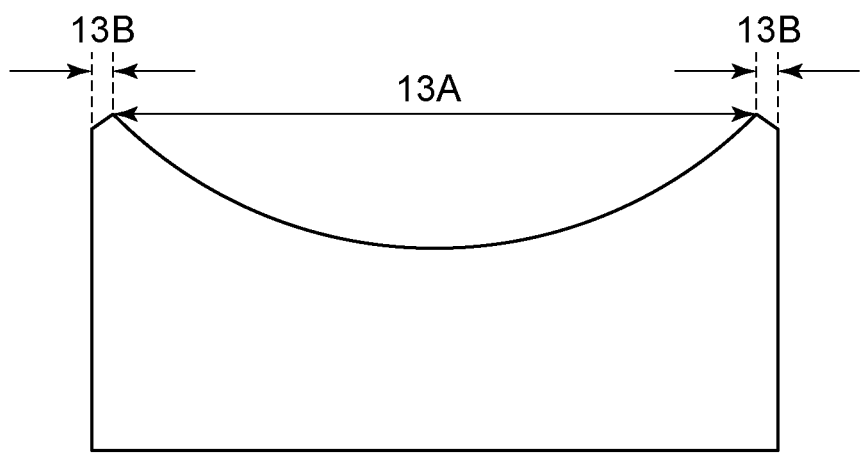
FIG. 3 schematically illustrates one embodiment of a mold used to produce the optical element according to an embodiment of the present disclosure.

Next, a method for producing an optical element according to an embodiment of the present disclosure will be described. Hereafter, a method for producing an optical element including a first substrate 11 having a convex surface, a resin member 12, a joining member 22, and a second substrate 21 having a concave surface laminated in sequence will be described. FIG. 3 schematically illustrates a mold used to form the resin member 12. FIGS. 4A to 4E and FIGS. 5A to 5D illustrate the method for producing an optical element according to an embodiment of the present disclosure. FIGS. 4A to 4E schematically illustrate a process of forming the resin member 12.

A mold 13 illustrated in FIG. 3 is used to form the resin member 12. The mold 13 has a concave surface 13A at which the first region 12A of the resin member is to be formed and an inclined surface 13B at which the inclined portion 112 disposed in the second region 12B of the resin member is to be formed. The inclined surface 13B inclines in a direction from the center of the mold 13 toward the outer periphery so that the thickness of the inclined portion increases toward the outer circumference of the resin member. The starting position of the inclined surface 13B is outside the optically effective region of the optical element, that is, in a region other than the optically effective region. The starting position of the inclined surface 13B is located outside the region of the outer diameter ϕ2 of the second substrate 21. The material for the mold 13 is not particularly limited, and may be, for example, a cemented carbide.

Figure 4A:
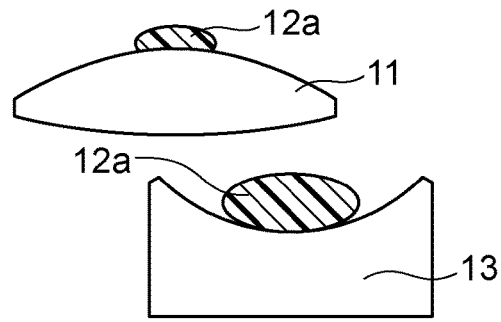
FIGS. 4A to 4E schematically illustrate a process of forming a resin member in a method for producing an optical element according to an embodiment of the present disclosure.

First, as illustrated in FIG. 4A, a first substrate 11 having a convex surface on which a resin is to be placed and a mold 13 having a concave surface on which a resin is to be placed are provided, and a resin 12a is applied onto the mold 13 and the first substrate 11. The resin 12a may be applied onto one of the mold 13 and the first substrate 11. The resin 12a is an uncured resin and serves as a precursor of the resin member 12. The resin 12a may be, for example, a photo-curable resin that can be cured by applying photo-energy or a thermosetting resin that can be cured by applying thermal energy. The resin 12a may be applied by any method such as a method using a dispenser. In the following description, the case where a photo-curable resin is used as the resin 12a will be described.

Figure 4D:
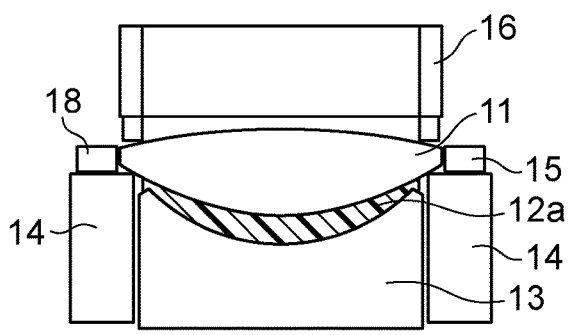
Figure 4B:
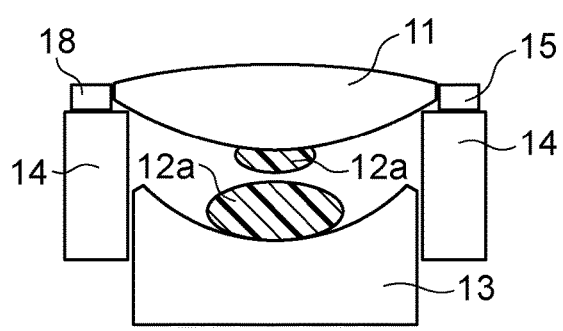

Subsequently, as illustrated in FIG. 4B, a first jig constituted by a supporting member 14, a movable member 15, and a fixed member 18 is provided, and the first substrate 11 is set in the first jig so that the surface of the first substrate 11 on which the resin 12a is applied faces the mold 13. At this time, the central axis of the mold 13 and the central axis of the first substrate 11 are aligned using the movable member 15.

Figure 4E:
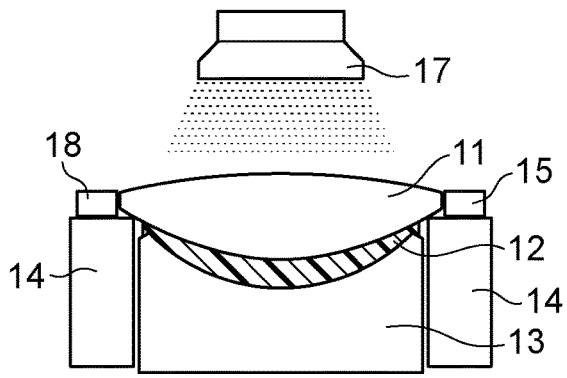
Figure 4C:
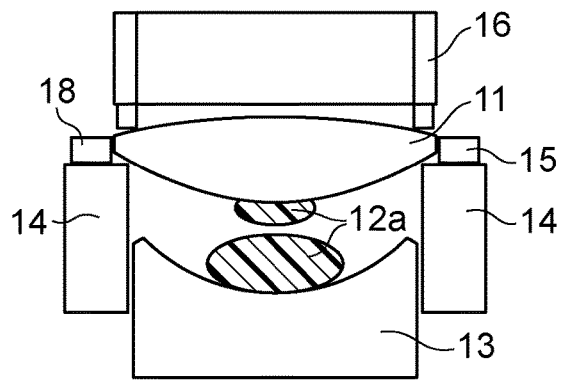

Subsequently, as illustrated in FIG. 4C, a pressurizing member 16 is brought into contact with the region other than the optically effective region of the first substrate 11 in order to apply pressure. The pressurizing member 16 is not particularly limited. For example, the pressurizing member 16 may have a structure in which rubbers are disposed at a plurality of concentric positions having the equal distance from the center and the plurality of rubbers come into contact with the first substrate 11. The pressure applied to the pressurizing member 16 is determined in accordance with, for example, the viscosity of a resin used and the shape of a substrate. When the pressure is within the range of 0.01 to 10 N/mm$^2$, for example, poor filling property and inclusion of air are suppressed.

Subsequently, as illustrated in FIG. 4D, the supporting member 14 is moved to decrease the distance between the mold 13 and the first substrate 11, thereby filling a space between the mold 13 and the first substrate 11 with the resin 12a extending in a radial direction of the first substrate 11. The movement of the supporting member 14 is terminated when the thickness of the resin 12a reaches a desired thickness. Then, the pressurizing member 16 is removed from the first substrate 11.

Subsequently, as illustrated in FIG. 4E, the resin 12a is irradiated with light from a light source 17 through the first substrate 11 to cure the resin 12a. After the resin 12a is cured, the mold 13 is removed to form a resin member 12 on the first substrate 11. Herein, during irradiation, nitrogen gas can be caused to flow to decrease the oxygen concentration to 0.01% or less for the purpose of preventing inhibition of curing of the photo-curable resin due to oxygen.

To facilitate the curing of the resin member 12, the resin member 12 can be irradiated with light while being heated at a temperature of 70° C. or higher and 100° C. or lower after the removal of the mold. Furthermore, the heating can be performed in a vacuum from the viewpoint of achieving a uniform rate of the curing reaction of the resin member 12 in a thickness direction of the resin member. This is because the inhibition of curing of the resin member 12 due to oxygen in the air can be suppressed. At this time, the vacuum level can be set to 20 Pa or less. The rate of the curing reaction of the resin member 12 can be set to 40% or more and 80% or less. If the rate of the curing reaction is less than 40%, the resin member 12 is not sufficiently cured. This increases a change in volume of the resin member due to changes in temperature and humility, which may deteriorate the optical performance. If the rate of the curing reaction is more than 80%, cracks may be formed in the resin member 12.

FIGS. 5A to 5D schematically illustrate a process of joining the second substrate 21.

Figure 5C:
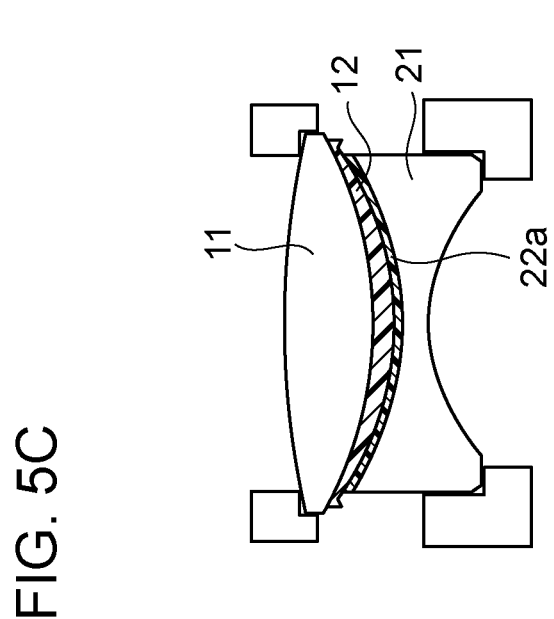
FIGS. 5A to 5D schematically illustrate a process of joining a second substrate in the method for producing an optical element according to an embodiment of the present disclosure.

First, a second substrate 21 having a concave surface is provided. As illustrated in FIG. 5A, an adhesive 22a is applied onto the first region 12A of the resin member and the second substrate 21. The adhesive 22a may be a photo-curable adhesive that can be cured by applying photo-energy or a thermosetting adhesive that can be cured by applying thermal energy. The adhesive 22a may be applied by any method such as a method using a dispenser. In the following description, the case where a photo-curable adhesive is used will be described.

Figure 5D:
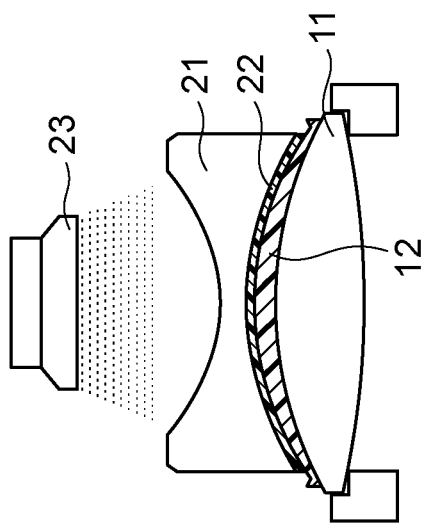
Figure 5A:
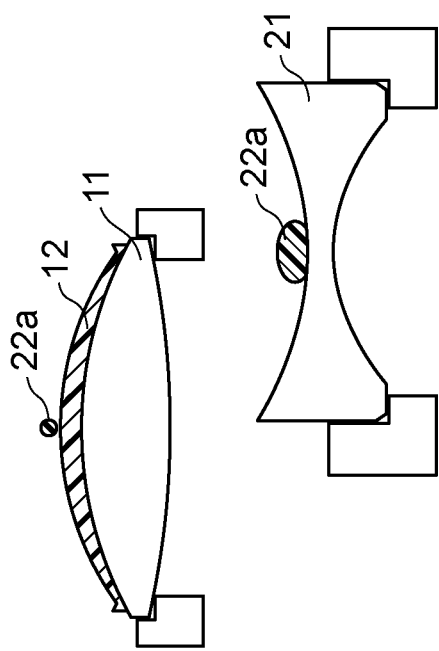
Figure 5B:
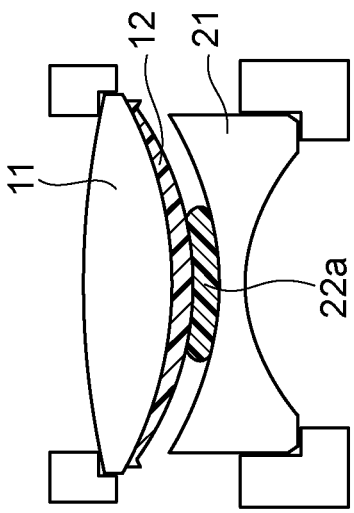

Subsequently, as illustrated in FIG. 5B, the second substrate 21 is brought close to the adhesive 22a applied onto the resin member 12 so as to face the adhesive 22a. As illustrated in FIG. 5C, the first substrate 11 and the second substrate 21 are brought close to each other so that the thickness of the adhesive 22a reaches a desired thickness, thereby filling a space between the first substrate 11 and the second substrate 21 with the adhesive 22a extending in radial directions of the first substrate 11 and the second substrate 21.

Subsequently, as illustrated in FIG. 5D, the adhesive 22a is cured using a light source 23 to form a joining member 22. The resin member 12 and the second substrate 21 are joined to each other with the joining member 22 interposed therebetween.

Through the above process, an optical element according to an embodiment of the present disclosure in FIG. 1 can be produced.

Image Pickup Apparatus

Figure 6:
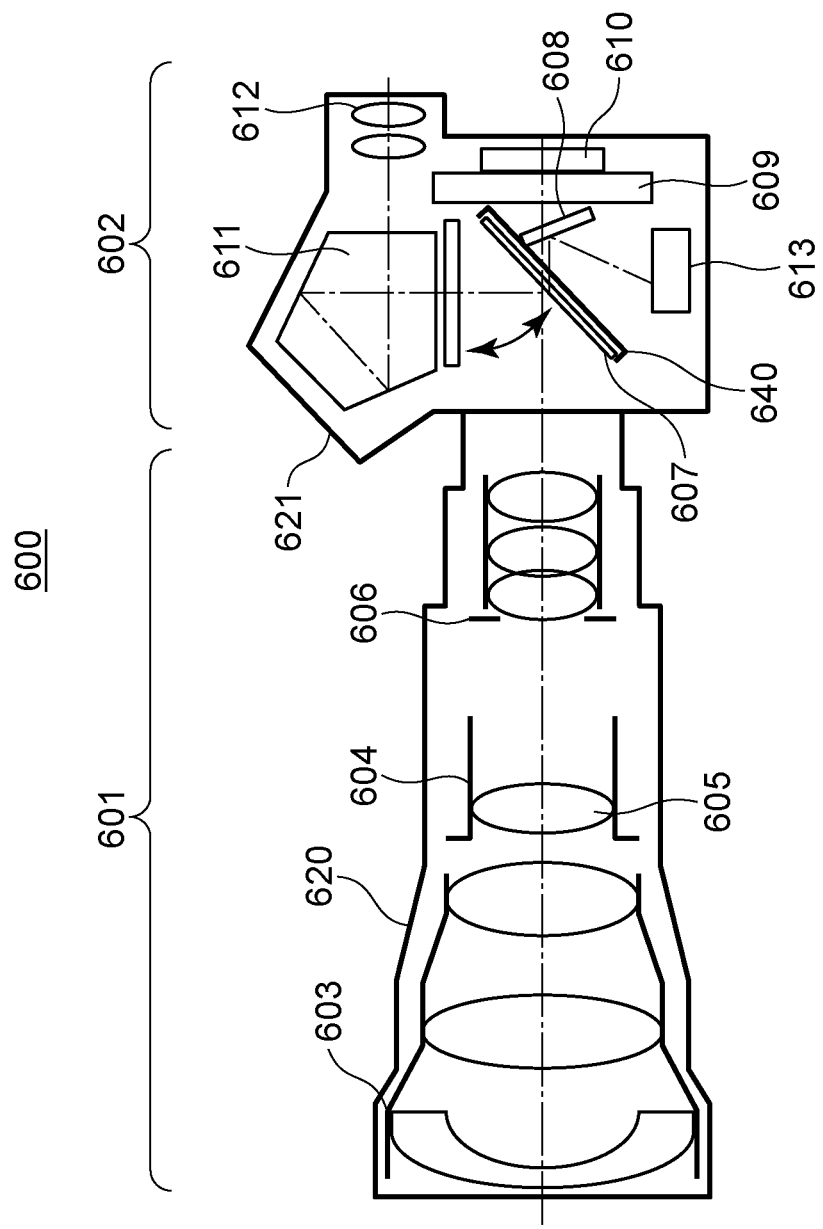
FIG. 6 schematically illustrates an image pickup apparatus according to an embodiment of the present disclosure.

FIG. 6 illustrates the configuration of a single-lens reflex digital camera 600, which is an example of an image pickup apparatus according to an embodiment of the present disclosure. In FIG. 6, a camera main body 602 and a lens barrel 601 serving as an optical apparatus are connected to each other, but the lens barrel 601 is an interchangeable lens that is detachable from the camera main body 602.

Light from a subject passes through an optical system constituted by, for example, a plurality of lenses 603 and 605 disposed along the optical axis of an image pickup optical system in a casing (casing 620) of the lens barrel 601, and is received by an image pickup element. The optical element according to an embodiment of the present disclosure can be used as, for example, a lens 603.

Herein, the lens 605 is supported by an inner barrel 604 and is movably supported by an outer barrel of the lens barrel 601 for focusing and zooming.

For the duration of observation before capturing, light from a subject is reflected by a main mirror 607 in a casing 621 of the camera main body and passes through a prism 611. Then, a photographer sees the capturing image through a viewfinder lens 612. The main mirror 607 is, for example, a half mirror. The light that has passed through the main mirror is reflected by a sub-mirror 608 toward an autofocusing (AF) unit 613, and this reflected light is used for, for example, focusing. The main mirror 607 is mounted on and supported by a main mirror holder 640 through adhesion. During capturing, the main mirror 607 and the sub-mirror 608 are moved to positions outside the optical path using a driving mechanism (not illustrated), a shutter 609 is opened, and the captured image incident from the lens barrel 601 is focused on the image pickup element 610. A diaphragm 606 is provided so that the brightness and focal depth during capturing can be changed by adjusting the aperture area.

The single-lens reflex digital camera has been described as an example of the image pickup apparatus according to an embodiment of the present disclosure. However, the optical element according to an embodiment of the present disclosure is applicable to various image pickup apparatuses including an image pickup optical system, such as video cameras, smartphones, and drones.

EXAMPLES

Next, the optical element and the method for producing an optical element according to embodiments of the present disclosure will be specifically described based on Examples. First, the optical element according to an embodiment of the present disclosure was evaluated by the following methods. The evaluation methods will be described.

Evaluation of Shape of Optical Element

The shape (thickness and inclination angle) of the inclined portion of the resin member in the optical element was evaluated by cutting the optical element along line IB-IB in FIG. 1A, observing the section with an optical microscope, and measuring the dimensions.

Evaluation of Separation after High-Temperature Durability Test

An optical element was inserted into a thermostatic chamber. The temperature was increased from 20° C. to 70° C. at a rate of 10° C./h over 5 hours, maintained at 70° C. for 1 hour, and then decreased from 70° C. to 20° C. at a rate of 10° C./h over 5 hours. After the temperature was decreased to 20° C., the optical element was taken out of the thermostatic chamber, and the presence or absence of separation of the optical element was observed with an optical microscope at room temperature (23° C.±2° C.). When separation with a length of 0.05 mm or more in a radial direction or a circumferential direction was observed between the first substrate and the resin member, the optical element was evaluated to be with separation. An evaluation result of "A" was given when no optical element among the produced five optical elements was subjected to separation. An evaluation result of "B" was given when one optical element among the produced five optical elements was subjected to separation. An evaluation result of "C" was given when two or more optical elements among the produced five optical elements were subjected to separation.

Method for Measuring Rate of Curing Reaction

The rate of the curing reaction of the resin member was measured using a Fourier transform infrared spectrometer (FTIR, manufactured by PerkinElmer, trade name: Spectrum One). Specifically, the peak area related to a carbon double bond in the absorption spectrum of the resin obtained by using the FTIR was determined, and the rate of the curing reaction was calculated from the following formula.

$$\left(1 - \frac{S1/S2}{S3/S4}\right) \times 100$$

S1: Peak area related to a double bond in a cured state
S2: Peak area not related to a double bond in a cured state
S3: Peak area related to a double bond in an uncured state
S4: Peak area not related to a double bond in an uncured state Example 1

The optical element illustrated in FIG. 1 was produced through the processes illustrated in FIGS. 4A to 4E and FIGS. 5A to 5D. The first substrate 11 was obtained by processing both surfaces of a glass material (manufactured by HOYA Corporation, trade name: TAFD45) into spherical surfaces with 42 mm. The mold 13 was obtained by mirror-polishing a cemented carbide (manufactured by FUJI DIE Co., Ltd., trade name: F10) so as to have an inverted shape of the resin member 12. The mold 13 was processed so as to have a concave surface (concave surface 13A) with a constant curvature (radius of curvature R=57.34 mm) to a position of 19.45 mm from the center. An inclined surface 13B was formed at the end of the mold 13 so as to surround the concave surface. The inclined surface 13B had such a shape that the thickness of the resin member 12 could be increased from a position of 19.55 mm from the center toward the outside of the mold. Furthermore, a straight line with a length of 0.1 mm was formed between the concave surface 13A and the inclined surface 13B so as to extend in a direction (horizontal direction) parallel to the surface on which the mold was placed.

That is, in Example 1, the shape of the mold 13 was designed so that the thickness of the resin member 12 was continuously decreased from a maximum thickness of 1.0 mm at the center to a minimum thickness of 50 µm at a position of 19.45 mm from the center. The shape of the mold 13 was also designed so that the resin member 12 had an inclined portion with a thickness that was gradually increased from a position of 19.55 mm from the center toward the outer circumference while the tangent L1 and the straight line L2 illustrated in FIG. 2 formed an angle of 45°.

First, a resin 12a was applied onto the first substrate 11 and the mold 13 using a dispenser (manufactured by Musashi Engineering, Inc., trade name: SMP-3) (FIG. 4A). The resin 12a was an acrylic photo-curable resin. Subsequently, a first jig constituted by a supporting member 14, a movable member 15, and a fixed member 18 was provided, and the first substrate was set in the first jig so that the surface of the first substrate on which the resin 12a was applied faced the mold 13. At this time, the mold 13 and the first substrate 11 were adjusted using the movable member 15 so that the distance between the central axis of the mold 13 and the central axis of the first substrate 11 in a horizontal direction was 20 µm or less (FIG. 4B).

Subsequently, a pressurizing member 16 was brought into contact with the first substrate 11 at a position of 18.0 mm from the center, which was a position in a region other than the optically effective region of the first substrate 11, and a pressure of 150 N was applied (FIG. 4C). Furthermore, the supporting member 14 was moved to decrease the distance between the mold 13 and the first substrate 11, thereby filling a space between the mold 13 and the first substrate 11 with the resin 12a extending in a radial direction of the first substrate 11. When the resin 12a extended to a position of 19.75 mm to 20.10 mm from the center, the movement of the supporting member 14 was terminated. Then, the pressurizing member 16 was removed from the first substrate 11 (FIG. 4D).

Subsequently, the resin 12a was irradiated with light from a light source 17 through the first substrate 11 to form a resin member 12 on the first substrate 11. The dose of light was 5 J. The resin member 12 was then released from the mold 13 (FIG. 4E). The irradiation was performed while nitrogen gas was caused to flow so that the oxygen concentration was set to 0.01% or less. The rate of the curing reaction of the resin member was 40%. To facilitate the curing of the resin member after the release from the mold, irradiation with light was performed while vacuum heating was performed at a vacuum level of 10 Pa and a temperature of 90° C. The dose of light was 10 J. The rate of the curing reaction of the resin member 12 after vacuum heating was 70%.

Subsequently, a second substrate 21 was provided. The second substrate 21 was obtained by processing both surfaces of a glass material (manufactured by OHARA INC., trade name: S-TIL2) into spherical surfaces (radius of curvature R=57.34 mm) with 438.6 mm. A photo-curable adhesive 22a (manufactured by Kyoritsu Chemical & Co., Ltd., trade name: WR8807LK) was applied onto the resin member 12 (FIG. 5A). Subsequently, the second substrate 21 was brought close to the adhesive 22a applied onto the resin member 12 so as to face the adhesive 22a (FIG. 5B). Furthermore, the distance between the first substrate 11 and the second substrate 21 was decreased to fill a space between the first substrate 11 and the second substrate 21 with the adhesive 22a having a thickness of 15 μm (FIG. 5C). Then, the adhesive 22a was cured using a light source 23 to join the resin member 12 and the second substrate 21 to each other with a joining member 22 interposed therebetween (FIG. 5D). Through the above process, an optical element in Example 1 was produced.

Five optical elements in Example 1 were produced by the above method and evaluated.

It was confirmed that the resin member of each of the optical elements in Example 1 had a shape (thickness and inclination angle of inclined portion) formed as designed. The maximum thickness of the inclined portion was 0.56 mm (560 μm). For the optical elements in Example 1, separation at the outer circumference of the first substrate 11 and the resin member 12 was not observed after the high-temperature durability test. Table 1 collectively shows the evaluation results of the optical elements in Example 1.

Example 2

An optical element in Example 2 was produced in the same manner as in the production method in Example 1, except that the angle of the inclined surface 13B of the mold 13 used to form the resin member 12 was changed. The optical element in Example 2 was designed so that the thickness of the inclined portion was gradually increased while the tangent L1 and the straight line L2 illustrated in FIG. 2 formed an angle of 30°.

Then, five optical elements in Example 2 were produced and evaluated.

It was confirmed that the resin member of each of the optical elements in Example 2 had a shape formed as designed. The maximum thickness of the inclined portion was 0.32 mm (320 μm). For the optical elements in Example 2, separation at the outer circumference of the first substrate 11 and the resin member 12 was not observed after the high-temperature durability test. Table 1 collectively shows the evaluation results of the optical elements in Example 2.

Example 3

An optical element in Example 3 was produced in the same manner as in the production method in Example 1, except that the angle of the inclined surface 13B of the mold 13 used to form the resin member 12 was changed. The optical element in Example 3 was designed so that the thickness of the inclined portion was gradually increased while the tangent L1 and the straight line L2 illustrated in FIG. 2 formed an angle of 38°.

Then, five optical elements in Example 3 were produced and evaluated.

It was confirmed that the resin member of each of the optical elements in Example 3 had a shape formed as designed. The maximum thickness of the inclined portion was 0.438 mm (438 μm). For the optical elements in Example 3, separation at the outer circumference of the first substrate 11 and the resin member 12 was not observed after the high-temperature durability test. Table 1 collectively shows the evaluation results of the optical elements in Example 3.

Example 4

An optical element in Example 4 was produced in the same manner as in the production method in Example 1, except that the angle of the inclined surface 13B of the mold 13 used to form the resin member 12 was changed. The optical element in Example 4 was designed so that the thickness of the inclined portion was gradually increased while the tangent L1 and the straight line L2 illustrated in FIG. 2 formed an angle of 25°.

Then, five optical elements in Example 4 were produced and evaluated.

It was confirmed that the resin member of each of the optical elements in Example 4 had a shape formed as designed. The maximum thickness of the inclined portion was 0.244 mm (244 μm). For the optical elements in Example 4, separation at the outer circumference of the first substrate 11 and the resin member 12 was observed on one optical element among the five optical elements after the high-temperature durability test. Table 1 collectively shows the evaluation results of the optical elements in Example 4.

Comparative Example 1

An optical element in Comparative Example 1 was produced in the same manner as in the production method in Example 1, except that the angle of the inclined surface 13B of the mold 13 used to form the resin member 12 was changed. The optical element in Comparative Example 1 was designed so that the thickness of the inclined portion was gradually increased while the tangent L1 and the straight line L2 illustrated in FIG. 2 formed an angle of 15°.

Then, five optical elements in Comparative Example 1 were produced and evaluated.

It was confirmed that the resin member of each of the optical elements in Comparative Example 1 had a shape formed as designed. For the optical elements in Comparative Example 1, separation at the outer circumference of the first substrate 11 and the resin member 12 was observed on three optical elements among the five optical elements after the high-temperature durability test. Table 1 collectively shows the evaluation results of the optical elements in Comparative Example 1.

Comparative Example 2

An optical element in Comparative Example 2 was produced in the same manner as in the production method in Comparative Example 1, except that the angle of the inclined surface 13B of the mold 13 used to form the resin member 12 was changed. The optical element in Comparative Example 2 was designed so that the thickness of the inclined portion was gradually increased while the tangent L1 and the straight line L2 illustrated in FIG. 2 formed an angle of 55°. During the production, the tip (near the point P2 at which the maximum thickness is provided) of the inclined portion of the resin member 12 after the release from the mold was broken and attached to the mold 13. Therefore, the mold 13 needed to be cleaned every time the molding was performed.

Then, five optical elements in Comparative Example 2 were produced and evaluated.

For the optical elements in Comparative Example 2, separation at the outer circumference of the first substrate 11 and the resin member 12 was observed on two optical elements among the five optical elements after the high-temperature durability test. The area of the separation was larger than that in Example 4 and Comparative Example 1. Table 1 collectively shows the evaluation results of the optical elements in Comparative Example 2.

TABLE 1

|  | Example 1 | Example 2 | Example 3 | Example 4 | Comparative Example 1 | Comparative Example 2 |
|---|---|---|---|---|---|---|
| Angle of inclined portion | 45° | 30° | 38° | 25° | 15° | 55° |
| Number of optical elements produced | 5 | 5 | 5 | 5 | 5 | 5 |
| Number of optical elements subjected to separation | 0 | 0 | 0 | 1 | 3 | 2 |
| Evaluation result | A | A | A | B | C | C |

In Examples 1 to 3 in which the tangent L1 and the straight line L2 formed an angle of 30° or more and 45° or less (the inclination angle of the inclined portion is 30° or more and 45° or less), separation did not occur at the interface between the first substrate 11 and the resin member 12 even after the high-temperature durability test. On the other hand, in Comparative Example 1 and Example 4 in which the tangent L1 and the straight line L2 formed an angle of less than 30°, separation occurred at the interface between the first substrate 11 and the resin member 12 after the high-temperature durability test. However, the number of optical elements subjected to separation was smaller in Example 4 in which the tangent L1 and the straight line L2 formed an angle of 25° than in Comparative Example 1. In Comparative Example 2 in which the tangent L1 and the straight line L2 formed an angle of more than 45°, the tip of inclined portion was chipped during the release from the mold. In Comparative Example 2, separation also occurred at the interface between the first substrate 11 and the resin member 12 after the high-temperature durability test.

To further examine these factors, the shape of the optical elements in Examples 1 and 2 and Comparative Examples 1 and 2 was modeled, and stress generated at the interface of the inclined portion 112 with the first substrate 11 after the high-temperature durability test was simulated by the finite element method. Abaqus was used as analysis software.

When the maximum stress in the surface normal direction of the first surface 11A of the first substrate was assumed to be 1 among stresses generated at the interface between the first substrate 11 and the inclined portion 112 in the model in Comparative Example 1, the maximum stress in Example 2 was 0.78. The maximum stress in Example 1 was 0.62.

This is because when the angle between the tangent L1 and the straight line L2 increases, the area in a direction in which the inclined portion 112 causes separation (the surface normal direction of the first surface 11A) increases, which reduces the stress in the normal direction per unit area of the inclined portion 112. That is, this simulation result supports that separation did not occur after the high-temperature durability test in Examples 1 and 2 whereas separation occurred in Comparative Example 1.

Next, when the maximum stress in the tangent direction of the first surface 11A of the first substrate was assumed to be 1 among stresses generated at the interface between the first substrate 11 and the inclined portion 112 in the model in Example 1, the maximum stress in Comparative Example 2 was 1.1. This is because when the angle between the tangent L1 and the straight line L2 increases, the area in a direction in which separation proceeds (the tangent direction of the first surface 11A of the substrate 11) decreases, which increases the stress in the tangent direction per unit area of the inclined portion 112. That is, this simulation result supports that separation did not occur after the high-temperature durability test in Example 1 whereas separation occurred in Comparative Example 2. The simulation result also supports that separation occurred in a larger area in Comparative Example 2 than in Comparative Example 1 and Example 4.

According to the present disclosure, even if the resin member deforms as a result of change in ambient temperature, the influence due to stress generated at the interface between the substrate and the resin member can be suppressed. This can provide an optical element in which separation does not readily occur between the substrate and the resin member. In Examples described above, the first substrate has a convex surface and the second substrate has a concave surface, but the first substrate and the second substrate may have a planar surface. Similarly, in Examples described above, the first region of the resin member has an uneven thickness shape whose thickness continuously decreases from the center toward the outer circumference, but the first region may have a uniform thickness in a portion other than the inclined portion.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of priority from Japanese Patent Application No. 2019-106575, filed Jun. 6, 2019, which is hereby incorporated by reference herein in its entirety.

What is claimed is:

1. An optical element comprising:
a first substrate having a first surface;
a resin member disposed on the first surface of the first substrate; and
a second substrate disposed above the resin member with a joining member interposed therebetween,
wherein the resin member has a first region that is in contact with the joining member and a second region that surrounds the first region and is not in contact with the joining member,
wherein an inclined portion having a thickness, as measured in a direction normal to the first surface, that increases from a starting point in the second region to a thickest point toward an outer circumference of the resin member, is disposed in the second region of the resin member, and
wherein a tangent of the first surface, orthogonal to a normal of the first surface which passes through the starting point of the inclined portion, and a straight line, that extends through the starting point and the thickest point, form an angle of 25° or more and 45° or less.

2. The optical element according to claim 1, wherein the normal and the straight line form an angle of 30° or more and 45° or less.

3. The optical element according to claim 1, wherein the thickest point of the inclined portion is disposed at the outer circumference of the resin member.

4. The optical element according to claim 3, wherein the inclined portion has a maximum thickness of 20 μm or more and 660 μm or less.

5. The optical element according to claim 1,
wherein the first surface of the first substrate is a convex surface, and a surface of the second substrate that is in contact with the joining member is a concave surface, and
the first region of the resin member has an uneven thickness shape that decreases in thickness, as measured in the normal direction to the first surface, from a center towards an outer circumference of the first region.

6. The optical element according to claim 1, wherein the resin member has a thickness of 10 μm or more and 3 mm or less.

7. A method for producing an optical element including a first substrate having a first surface, a resin member that is disposed on the first surface of the first substrate and that has a first region and a second region surrounding the first region, and a second substrate disposed above the first region of the resin member with a joining member interposed therebetween, the method comprising:
a step of forming a resin member on the first surface of the first substrate using a mold, the resin member including an inclined portion which is located in the second region and that increases in thickness from a starting point located in the second region to a thickest point toward an outer circumference; and
a step of joining the first region of the resin member and the second substrate to each other with an adhesive,
wherein a tangent of the first surface, orthogonal to a normal of the first surface which passes through the starting point of the inclined portion, and a straight line that extends through the starting point and the thickest point, form an angle of 25° or more and 45° or less.

8. An optical apparatus comprising:
a casing; and
an optical system including a plurality of lenses in the casing,
wherein at least one of the plurality of lenses is an optical element,
wherein the optical element comprises a first substrate having a first surface, a resin member disposed on the first surface of the first substrate;
and a second substrate disposed above the resin member with a joining member interposed therebetween,
wherein the resin member has a first region that is in contact with the joining member and a second region that surrounds the first region and is not in contact with the joining member,
wherein an inclined portion having a thickness, as measured in a direction normal to the first surface, that increases from a starting point in the second region to a thickest point toward an outer circumference of the resin member, is disposed in the second region of the resin member, and
wherein a tangent of the first surface, orthogonal to a normal of the first surface which passes through the starting point of the inclined portion, and a straight line, that extends through the starting point and the thickest point, form an angle of 25° or more and 45° or less.

9. An image pickup apparatus comprising:
a casing;
an optical system including a plurality of lenses in the casing; and
an image pickup element that receives light passing through the optical system,
wherein at least one of the plurality of lenses is an optical element,
wherein the optical element comprises a first substrate having a first surface, a resin member disposed on the first surface of the first substrate; and a second substrate disposed above the resin member with a joining member interposed therebetween,
wherein the resin member has a first region that is in contact with the joining member and a second region that surrounds the first region and is not in contact with the joining member,
wherein an inclined portion having a thickness, as measured in a direction normal to the first surface, that increases from a starting point in the second region to a thickest point toward an outer circumference of the resin member, is disposed in the second region of the resin member, and
wherein a tangent of the first surface, orthogonal to a normal of the first surface which passes through the starting point of the inclined portion, and a straight line, that extends through the starting point and the thickest point, form an angle of 25° or more and 45° or less.

10. The image pickup apparatus according to claim 9, wherein the image pickup apparatus is a camera.

* * * * *